United States Patent
alSafadi et al.

(10) Patent No.: US 6,467,088 B1
(45) Date of Patent: Oct. 15, 2002

(54) RECONFIGURATION MANAGER FOR CONTROLLING UPGRADES OF ELECTRONIC DEVICES

(75) Inventors: Yasser alSafadi, Yorktown Heights, NY (US); J. David Schaffer, Wappingers Falls, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/343,607

(22) Filed: Jun. 30, 1999

(51) Int. Cl.$^7$ ............................................. G06F 9/45
(52) U.S. Cl. ..................................... 717/173; 713/100
(58) Field of Search ................................ 717/173, 178, 717/177; 710/10; 713/100

(56) References Cited

U.S. PATENT DOCUMENTS

| | | | |
|---|---|---|---|
| 5,155,847 A | | 10/1992 | Kirouac et al. ............. 395/600 |
| 5,253,344 A | * | 10/1993 | Bostick et al. .................. 710/8 |
| 5,327,560 A | * | 7/1994 | Hirata et al. ................ 709/221 |
| 5,497,490 A | * | 3/1996 | Harada et al. .............. 713/100 |
| 5,634,075 A | * | 5/1997 | Smith et al. .................... 710/9 |
| 5,822,531 A | * | 10/1998 | Gorczyca et al. ........... 707/202 |
| 5,898,872 A | * | 4/1999 | Richley ....................... 713/100 |
| 5,918,194 A | * | 6/1999 | Banaska et al. .............. 702/91 |
| 5,933,026 A | * | 8/1999 | Larsen et al. .................. 326/81 |
| 6,058,455 A | * | 5/2000 | Islam et al. .................... 710/10 |
| 6,065,068 A | * | 5/2000 | Foote ............................ 710/10 |
| 6,167,408 A | * | 12/2000 | Cannon et al. ............. 707/200 |
| 6,301,707 B1 | * | 10/2001 | Carroll et al. .............. 717/177 |
| 6,385,668 B1 | * | 5/2002 | Gaddess et al. ............. 370/254 |

FOREIGN PATENT DOCUMENTS

| | | | | |
|---|---|---|---|---|
| EP | 0308056 | * | 3/1989 | ........... G06F/11/00 |
| GB | 2325766 | | 12/1998 | ............. G06F/9/44 |
| WO | WO9015394 | | 6/1990 | ........... G06F/15/46 |
| WO | WO9425923 | | 11/1994 | ........... G06F/15/21 |
| WO | WO9632679 | | 10/1996 | ........... G06F/13/00 |

OTHER PUBLICATIONS

Mitchell et al., Dynamically Reconfiguring Multimedia Components: A Model—Based Approach, Sep. 1998, ACM, p. 40–46.*

* cited by examiner

*Primary Examiner*—Gregory Morse
*Assistant Examiner*—John Q. Chavis
(74) *Attorney, Agent, or Firm*—Daniel J. Piotrowski

(57) ABSTRACT

A reconfiguration manager implemented on a computer or other data processing device controls the reconfiguration of software or other components of an electronic device such as a computer, personal digital assistant (PDA), set-top box, television, etc. The reconfiguration manager receives a reconfiguration request, e.g., a software upgrade request from the electronic device, and determines one or more device components that are required to implement the reconfiguration request. The reconfiguration manager also determines, e.g., from information in the request, identifiers of one or more additional components currently implemented in the electronic device. The reconfiguration manager then compares the needed and currently implemented components with previously-stored lists of known acceptable and unacceptable configurations for the electronic device. If the needed and currently implemented components correspond to a configuration on the list of acceptable configurations, the request is approved and the needed components are downloaded to the electronic device. If the needed and currently implemented components correspond to a configuration on the list of unacceptable configurations, the request is denied. Otherwise, the reconfiguration manager may indicate that the requested reconfiguration is unknown, or may take another action such as responding to the electronic device with a list of other components that would be required to implement the request.

21 Claims, 3 Drawing Sheets

RECONFIGURATION MANAGER FOR CONTROLLING UPGRADES OF ELECTRONIC DEVICES

FIELD OF THE INVENTION

The present invention relates generally to the field of electronic devices, and more particularly to techniques for upgrading or otherwise reconfiguring software and/or hardware components in such devices.

BACKGROUND OF THE INVENTION

For many different electronic devices, such as desktop, laptop and palmtop computers, personal digital assistants (PDAs), telephones, televisions, set-top boxes and other consumer electronic processing devices, it is common for ongoing development efforts to continue to produce improvements to existing device software or hardware components, as well as new components that add to or otherwise improve device functionality. Users of such devices often prefer to upgrade their devices, incrementally, rather than discard their current devices and purchase new ones. However, for most contemplated upgrades, it is generally necessary to determine if the new or improved component is compatible with the rest of the device, and if not, what other components would need simultaneous upgrading in order to provide the desired compatibility. This compatibility determination can be particularly difficult if the range of possible device configurations is large and the interaction among device components is complex.

A number of different techniques have been developed for updating components of electronic devices. For example, U.S. Pat. No. 5,155,847 discloses a technique for updating software at remote locations. A central computer system stores the original software, and keeps track of all the software configurations for a number of remote systems. The remote system software is upgraded or otherwise changed based on patches transmitted by the central computer system. However, this technique generally requires the central computer system to keep track of the particular software configurations at each of the remote systems. Furthermore, the technique is not directly applicable to electronic devices other than computers, and cannot efficiently handle reconfiguration of hardware components, or hardware and software interdependencies.

Another conventional technique, described in PCT Application No. WO 94/25923, manages the configuration of an enterprise-wide network which includes at least one centralized computer and a plurality of desktop computers. The technique attempts to ensure that each of the desktop computers has an appropriate set of resources as determined in accordance with a set of enterprise policies. However, the technique generally assumes that the resources required by each desktop computer are independent, and fails to adequately address situations in which the required resources are highly interdependent. Furthermore, this technique generally assumes that the information regarding component interactions is fully specified and built in to the system.

UK Patent Application No. GB 2,325,766 discloses a version management system for keeping files on remote devices updated to latest versions as determined by a master list maintained on a central server. The updating process in this approach generally involves adding, amending and deleting files in their entirety. A significant problem with this approach is that it apparently assumes either that the files are independent or that any potential conflicting requirements have already been resolved using other techniques. It fails to provide generalized techniques for ensuring compatibility among requested components.

A convention technique disclosed in PCT Application No. WO 96/32679 describes the remote patching of operating code in a mobile unit of a distributed system. A manager host device in the system transmits patches to the mobile unit, and the mobile unit creates patched operating code by merging the patches with current operating code and switching execution to the patched operating code. However, like the other conventional techniques described previously, this technique also fails to adequately ensure compatibility among software and hardware components for a variety of different electronic devices.

As is apparent from the above, a need exists for improved techniques for managing reconfiguration of electronic devices, such that compatibility determinations can be facilitated, particularly for large and complex device configurations.

SUMMARY OF THE INVENTION

The invention provides a reconfiguration manager that may be implemented on a computer or other data processing device to control the reconfiguration of software or other components of an electronic device such as a computer, personal digital assistant (PDA), set-top box, television, etc. In accordance with the invention, a reconfiguration manager receives a reconfiguration request, e.g., a software upgrade request from the electronic device, and determines one or more device components that are required to implement the reconfiguration request. The reconfiguration request can be received directly from the electronic device itself, or otherwise supplied to the reconfiguration manager.

The reconfiguration manager also determines, e.g., from information supplied by the electronic device as part of the request, identifiers of one or more additional components currently implemented in the electronic device. The reconfiguration manager then compares the needed and currently implemented components with previously-stored lists of known acceptable and unacceptable configurations for the electronic device. If the needed and currently implemented components correspond to a configuration on the list of acceptable configurations, the request is approved and the needed components are downloaded or otherwise supplied to the electronic device. If the needed and currently implemented components correspond to a configuration on the list of unacceptable configurations, the request is denied. Otherwise, the reconfiguration manager may indicate that the requested reconfiguration is unknown, or may take another action such as responding to the electronic device with a list of other components that would be required to implement the reconfiguration request.

Advantageously, the invention provides efficient techniques for incrementally upgrading or otherwise reconfiguring electronic devices. The invention ensures that upgrades are compatible with the configuration of a given device before they are implemented in that device, thereby avoiding problems associated with inconsistent upgrades. Although particularly well suited for use with software upgrades delivered over a network, the invention is applicable to reconfiguration of other types of device components, e.g., hardware components or combinations of hardware and software components, and to numerous other applications. These and other features and advantages of the present invention will become more apparent from the accompanying drawings and the following detailed description.

DETAILED DESCRIPTION OF THE INVENTION

Figure 1:
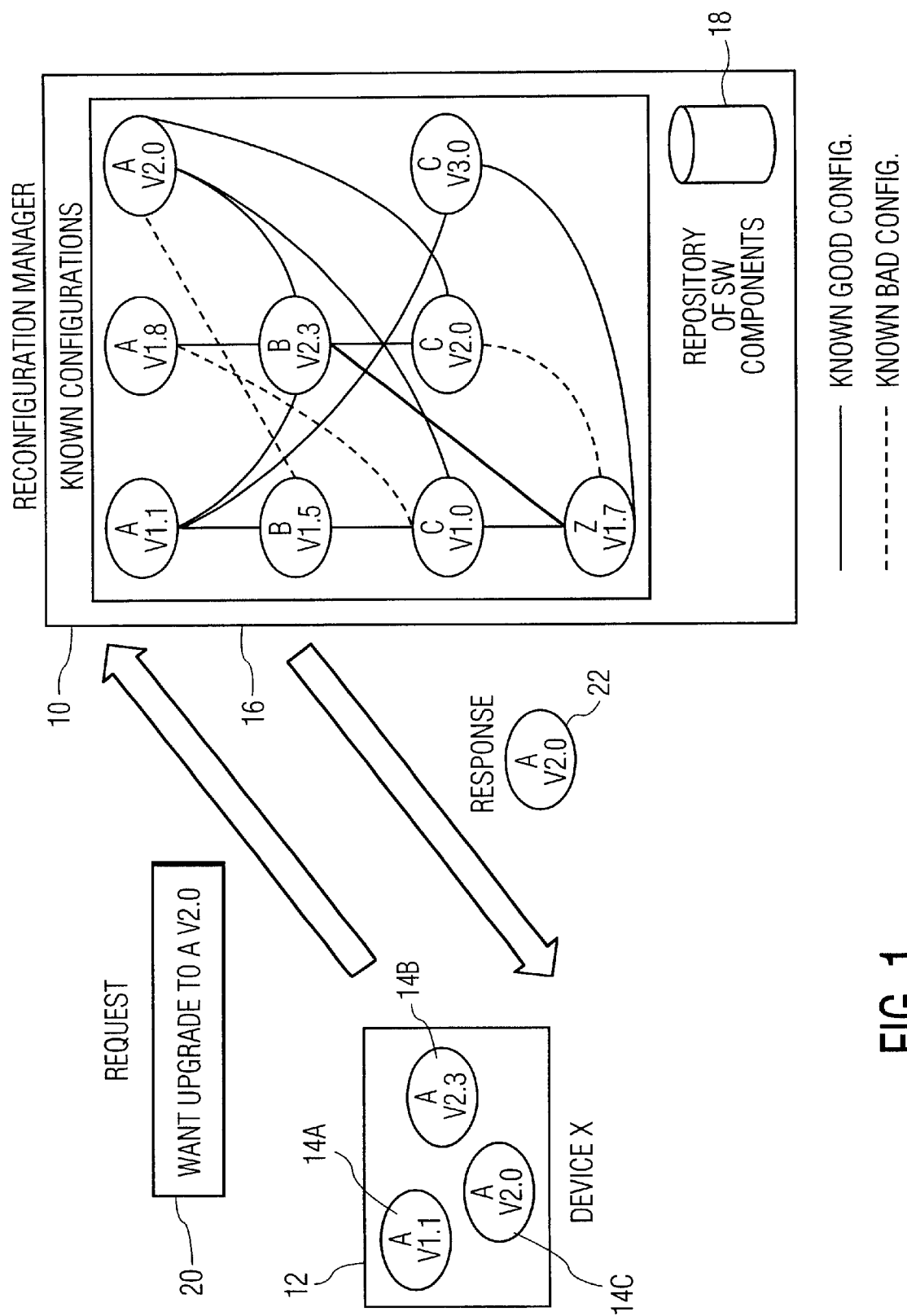
FIG. 1 illustrates the operation of a reconfiguration manager in accordance with a preferred embodiment of the invention.

FIG. 1 shows a preferred embodiment of the invention, in which a reconfiguration manager 10 interacts with an electronic device 12 also referred to as "Device X." The device 12 may represent a desktop, laptop or palmtop computer, a personal digital assistant (PDA), a telephone, television, set-top box or any other type of consumer electronic processing device. The device 12 includes a number of software components 14A, 14B and 14C, corresponding to version 1.1 of a software component A, version 2.3 of a software component B, and version 2.0 of a software component C, respectively. The reconfiguration manager 10 may be implemented on a computer, a set of computers, or any other type of data processing system or device.

The reconfiguration manager 10 includes a listing 16 of known configurations, and a repository 18 of software components. Repository 18 may represent, e.g., a database, data warehouse, physical warehouse or any other type of storage device or element incorporated in or otherwise associated with a computer or other processing system or device on which the reconfiguration manager 10 is implemented. The repository 18 need not be co-located with the processing portions of the reconfiguration manager 10. For example, the repository 18 could be accessed by the reconfiguration manager 10 over a suitable network connection.

The list 16 in this example is illustrated in the form of a graph indicating which of a set of software components supported by the manager 10 are known to work well together or are otherwise compatible. The list 16 includes identifiers of a number of software components, each represented by an oval, including components corresponding to versions 1.1, 1.8 and 2.0 of the software component A, versions 1.5 and 2.3 of the software component B, versions 1.0, 2.0 and 3.0 of a software component C, and version 1.7 of a software component Z. Each of at least a subset of these components of the list 16 may be stored in the software component repository 18. Additional components not shown may also be stored in the repository 18.

A solid line between a given pair of components in the exemplary list 16 indicates that the pair of components corresponds to a known "good" configuration, i.e., the components work well together or are otherwise compatible. The pair including version 1.1 of component A and version 1.5 of component B is an example of a known good configuration. A dashed line between a given pair of components in the list 16 indicates that the pair of components correspond to a known "bad" configuration, i.e., are not compatible. The pair including version 1.8 of component A and version 1.0 of component C is an example of a known bad configuration.

It should be understood that the list 16, although shown in graphical form in FIG. 1, may be implemented, e.g., as a stored table, set of tables or other type of list in a memory of the reconstruction manager 10, as a potion of a program executed by the reconfiguration manager 10, or in any other suitable format. Moreover, although illustrated in FIG. 1 as indicating pair-wise compatibility among components, the list in other embodiments could include information indicative of compatibility between groups of multiple components. The term "list" as used herein is therefore intended to include any stored representation of information indicative of component compatibility. A given stored list in accordance with the invention can be implemented in a straight-forward manner, as will be apparent to those skilled in the art.

In operation, the reconfiguration manager 10 receives a request 20 from the device 12. In this example, the request 20 indicates that a user of the device 12 wants to upgrade the device to include version 2.0 of software component A. The request in the illustrative embodiment also includes a list of the components currently in the device, i.e., version 1.1 of component A, version 2.0 of component C and version 2.3 of component B. The request may include additional information, such as any needed information regarding the interconnection of the components or other parameters associated with the device. The reconfiguration manager 10 processes the request, in a manner to be described in greater detail in conjunction with the flow diagram of FIG. 2, and if appropriate delivers to device X a response 22 which includes the requested version 2.0 of software component A.

For example, the reconfiguration manager first determines whether the requested upgrade, in this case version 2.0 of component A, is compatible with other components of device X, i.e., version 2.3 of component B and version 2.0 of component C. The reconfiguration manager 10 in the embodiment of FIG. 1 makes this determination using the list 16. In this case, list 16 indicates that version 2.0 of component A is compatible with version 2.3 of component B and version 2.0 of component C. As a result, the requested upgrade is delivered to device 12 as part of the response 22.

Figure 2:
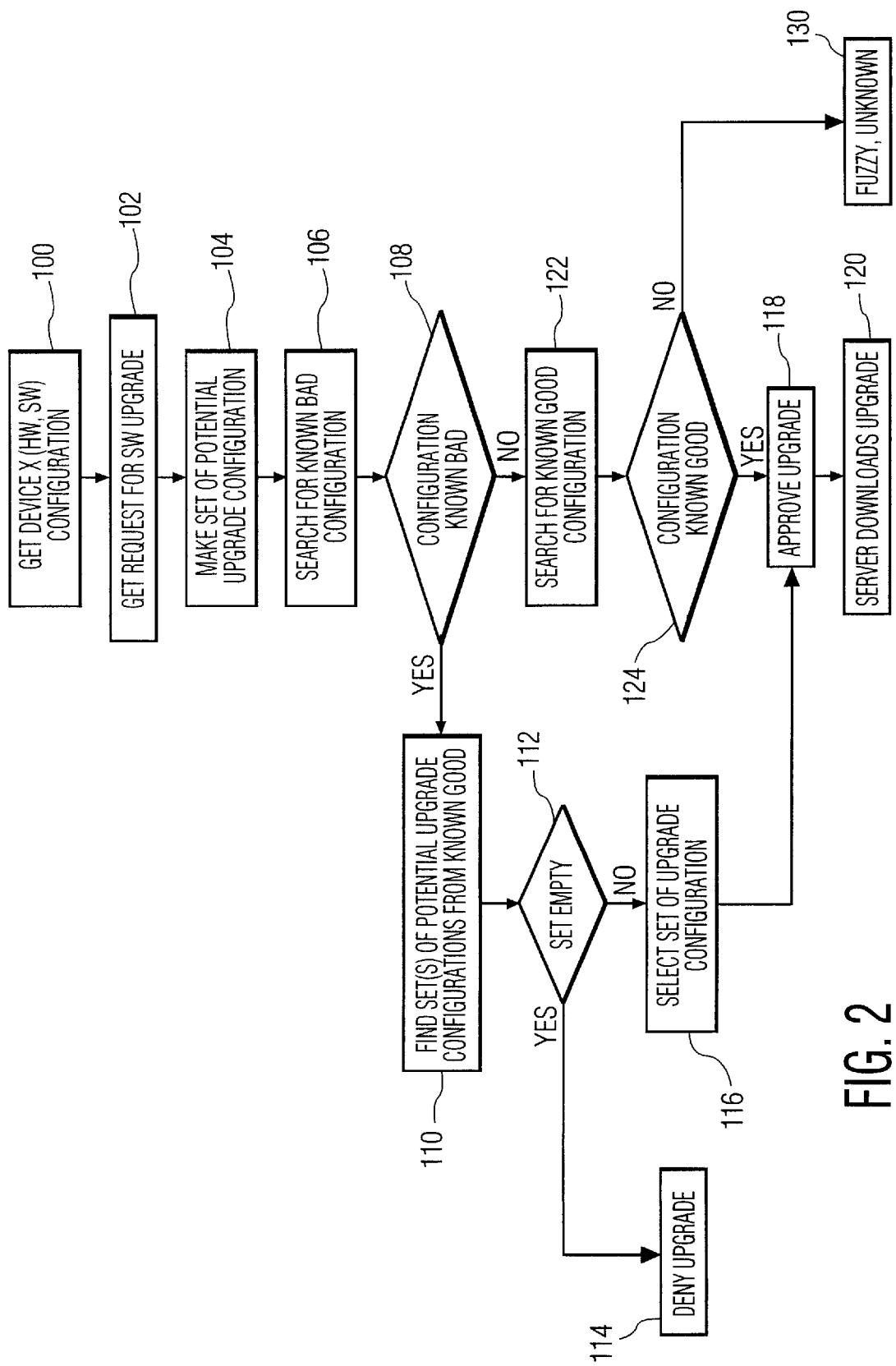
FIG. 2 is a flow diagram showing processing operations implemented in the reconfiguration manager of FIG. 1.

FIG. 2 shows a flow diagram illustrating the operation of the reconfiguration manager 10 in greater detail. In step 100, the reconfiguration manager 10 obtains information regarding the hardware and software configuration of device X, i.e., electronic device 12 of FIG. 1. This information is generally included as part of the request 20 sent by the device 12 to the reconfiguration manager 10. In other embodiments, this information may be obtained in another suitable manner, e.g., from a local database based on a serial number or other identifier of the electronic device.

In step 102, the reconfiguration manager 10 determines that the request 20 includes a request for a software upgrade, i.e., a request to upgrade to version 2.0 of component A. It should be noted that, although described primarily in conjunction with software upgrades, the invention is also applicable to hardware upgrades, and to upgrades in combinations of hardware and software, as well as to other changes in device configuration. In the FIG. 2 example, the request is for an upgrade to a particular software component. Other types of requests which may be processed by the reconfiguration manager 10 of FIG. 1 include requests for an upgrade to a particular device feature. Such a feature upgrade may require the reconfiguration manager to upgrade several device components.

In step 104 of FIG. 2, the reconfiguration manager 10 generates a potential upgrade configuration that will satisfy the received request. The reconfiguration manager in step 106 then searches through a set of known bad configurations. If the upgrade configuration as generated in step 104 is determined in step 108 to correspond to one of the known bad configurations, the reconfiguration manager in step 110 attempts to find a set or sets of potential upgrade configurations from a set of known good configurations.

If the resulting set of potential upgrade configurations is determined in step 112 to be empty, the reconfiguration manager in step 114 denies the upgrade, since it is known to be incompatible with the current configuration of device X, and communicates this denial in its response to device X. If step 112 indicates that the set is not empty, a particular set of upgrade configuration is selected in step 116, and the upgrade is approved in step 118 as compatible with the current configuration of device X. The selection in step 116 may be based at least in part on one or more established criteria, such as least expensive, maximum improvement in system operating speed, most recently modified, most energy efficient, or other suitable criteria. The reconfiguration manager or other server associated therewith then downloads the upgrade to device X in step 120.

If step 108 determines that the upgrade configuration as generated in step 104 does not correspond to a known bad configuration, the reconfiguration manager in step 122 searches the list of known good configurations to determine if the upgrade configuration determined in step 104 is a known good configuration. If it is determined in step 124 to be a known good configuration, the upgrade is approved in step 118, and the reconfiguration manager or other server associated therewith downloads the upgrade to device X in step 120. If the configuration is not a known good configuration, the reconfiguration manager in step 130 returns in its response to the device X an indication that the requested upgrade is "fuzzy" or unknown, e.g., not known to be valid.

Other types of responses that may be generated by the reconfiguration manager 10 include, e.g., a response which includes a list of additional components that are prerequisites for the requested upgrade. This type of response may provide a user associated with device X with an option to download all of the components required to implement the desired upgrade.

Figure 3:
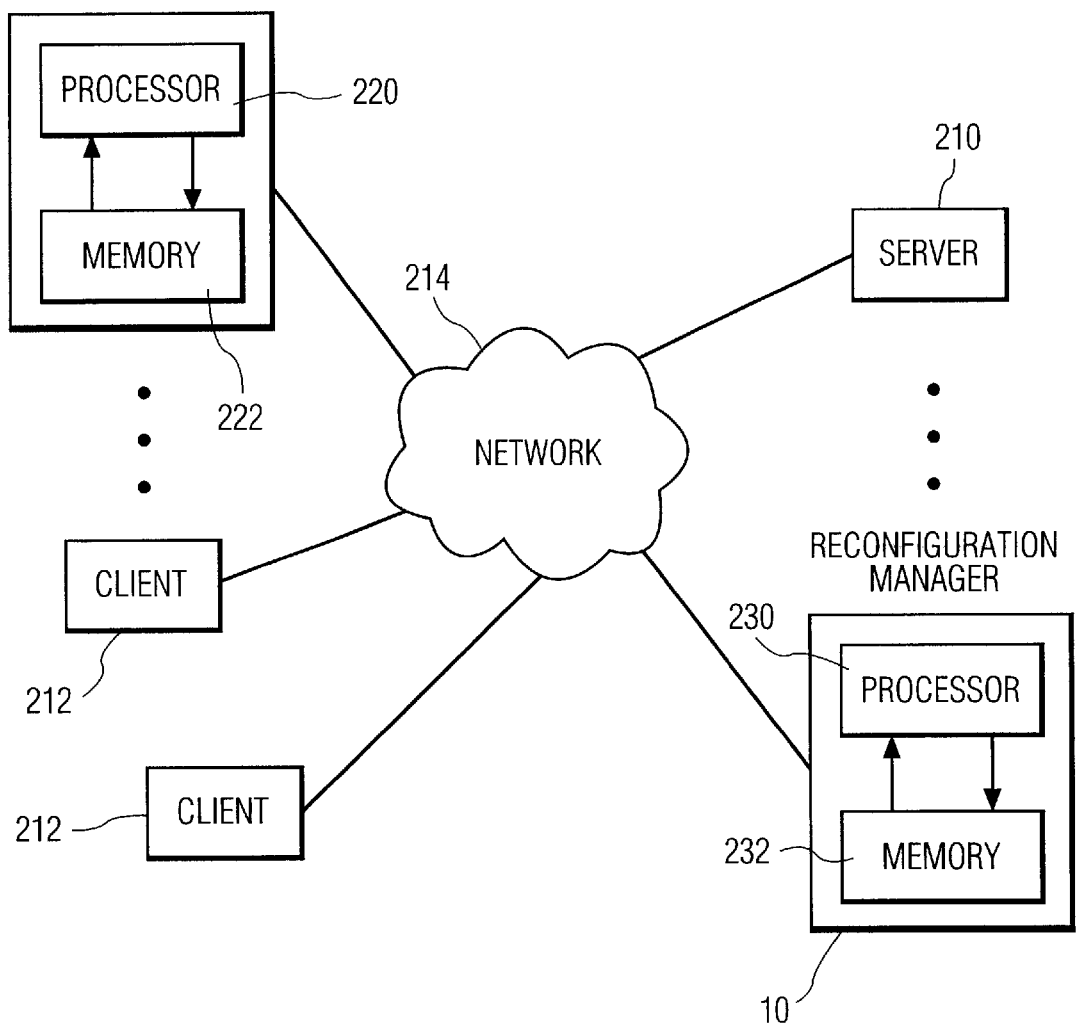
FIG. 3 is a block diagram of an exemplary network-based computer system which includes a reconfiguration manager in accordance with the invention.

FIG. 3 shows an example of a system 200 in which a reconfiguration manager in accordance with the invention may be implemented. The system 200 includes reconfiguration manager 10 and electronic device 12 as previously described in conjunction with FIGS. 1 and 2. The reconfiguration manager 10 and electronic device 12 are connected with a number of server devices 210 and client devices 212 over a network 214. As previously noted, the reconfiguration manager 10 and electronic device 12 may be implemented as computers or other electronic data processing devices. In this example, the electronic device 12 includes a processor 220 and a memory 222, and the reconfiguration manager 10 includes a processor 230 and a memory 232.

The processors 220 and 230 may represent, e.g., microprocessors, central processing units, computers, circuit cards, application-specific integrated circuits (ASICs), as well as portions or combinations of these and other types of processing devices. The memories 222 and 232 may represent, e.g., disk-based optical or magnetic storage units, electronic memories, as well as portions or combinations of these and other memory devices.

The functional operations associated with the reconfiguration manager 10 and electronic device 12, as described in detail in conjunction with FIGS. 1 and 2, may be implemented in whole or in part in one or more software programs stored in their respective memories 222, 232 and executed by their respective processors 220, 230. The network 214 may represent a global computer communications network such as the Internet, a wide area network, a metropolitan area network, a local area network, a cable network, a satellite network or a telephone network, as well as portions or combinations of these and other types of networks. Reconfiguration manager 10 and device 12 may themselves be respective server and client machines coupled to the network 214.

It should be noted that the reconfiguration manager need not receive a reconfiguration request directly from the electronic device itself. For example, it is possible for the reconfiguration manager to receive requests from an intermediary, e.g., a server or other designated machine which collects reconfiguration requests from multiple devices or users and delivers the requests in an appropriate manner to the reconfiguration manager. As another example, a help desk operator or other human or machine interface can receive reconfiguration requests from users of electronic devices. In such applications, information identifying the electronic device, e.g., the device serial number, may be supplied by the user. Information regarding the particular components in the device may be determined, e.g., by accessing a local database using the device identifying information, may be supplied directly by the user, or may be determined using combinations of these and other techniques.

The above-described embodiments of the invention are intended to be illustrative only. For example, the invention can be used to implement upgrading or other reconfiguration of any desired type of software or hardware component, as well as combinations of these and other components, for any desired type of electronic device, and in many applications other than those described herein. The invention can also be implemented at least in part in the form of one or more software programs which are stored on an otherwise conventional electronic, magnetic or optical storage medium and executed by a processing device, e.g., by the processors 220 and 230 of system 200. These and numerous other embodiments within the scope of the following claims will be apparent to those skilled in the art.

What is claimed is:

1. A processor-implemented method for controlling the reconfiguration of an electronic device, the method comprising the steps of:

receiving information representative of a reconfiguration request relating to the electronic device;

determining at least one device component required to implement the reconfiguration request;

comparing the determined component and information specifying at least one additional component currently implemented in the electronic device with at least one of a list of known acceptable configurations for the electronic device and a list of known unacceptable configurations for the electronic device; and generating information indicative of an approval or a denial of the reconfiguration request based at least in part on the result of the comparing step.

2. The method of claim 1 further including the step of generating information indicative of an approval of the reconfiguration request if the determined-component and the additional component are consistent with a given one of the known acceptable configurations.

3. The method of claim 1 further including the step of downloading the determined component to the electronic device if the determined component and the additional component are consistent with a given one of the known acceptable configurations.

4. The method of claim 1 further including the steps of:

comparing the determined, component and information specifying at least one additional component currently implemented in the electronic device with the list of known unacceptable configurations for the electronic device; and generating information indicative of a denial of the reconfiguration request if the determined component and the additional component are consistent with a given one of the known unacceptable configurations.

5. The method of claim 1 further including the steps of:

comparing the determined component and information specifying at least one additional component currently implemented in the electronic device with the list of known unacceptable configurations for the electronic device; and generating information indicating that the requested reconfiguration is unknown if the determined component and the additional component are not consistent with a given one of the known acceptable or unacceptable configurations.

6. The method of claim 1 further including the step of transmitting in response to the reconfiguration request a list of additional components required in the electronic device in order to implement the reconfiguration.

7. The method of claim 1 wherein the information specifying at least one additional component currently implemented in the electronic device includes identifiers of each of the components in a set of components currently implemented in the electronic device.

8. The method of claim 7 wherein the identifiers of each of the components in the set of components are included in the reconfiguration request.

9. The method of claim 1 wherein the reconfiguration request comprises a request for an upgrade of at least one of a software component and a hardware component of the electronic device.

10. The method of claim 1 wherein the reconfiguration request is received from the electronic device over a network connection established with a reconfiguration manager implementing the receiving, determining, comparing and generating steps.

11. An apparatus for controlling the reconfiguration of an electronic device, the apparatus comprising:

a memory for storing at least one of a list of known acceptable configurations for the electronic device and a list of known unacceptable configurations for the electronic device; and a processor coupled to the memory and operative (i) to receive information representative of a reconfiguration request relating to the electronic device; (ii) to determine at least one device component required to implement the reconfiguration request; (iii) to compare the determined component and information specifying at least one additional component currently implemented in the electronic device with at least one of the list of known acceptable configurations for the electronic device and the list of known unacceptable configurations for the electronic device; and (iv) to generate information indicative of an approval or a denial of the reconfiguration request based at least in part on the comparison operation.

12. The apparatus of claim 11 wherein the processor is further operative to generate information indicative of an approval of the reconfiguration request if the determined component and the additional component are consistent with a given one of the known acceptable configurations.

13. The apparatus of claim 11 wherein the processor is further operative to download the determined component to the electronic device if the determined component and the additional component are consistent with a given one of the known acceptable configurations.

14. The apparatus of claim 11 wherein the processor is further operative to compare the determined component and information specifying at least one additional component currently implemented in the electronic device with the list of known unacceptable configurations for the electronic device; and to generate information indicative of a denial of the reconfiguration request if the determined component and the additional component are consistent with a given one of the known unacceptable configurations.

15. The apparatus of claim 11 wherein the processor is further operative to compare the determined component and information specifying at least one additional component currently implemented in the electronic device with a list of known unacceptable configurations for the electronic device; and to generate information indicating that the requested reconfiguration is unknown if the determined component and the additional component are not consistent with a given one of the known acceptable or unacceptable configurations.

16. The apparatus of claim 11 wherein the processor is further operative to transmit in response to the reconfiguration request a list of additional components required in the electronic device in order to implement the reconfiguration request.

17. The apparatus of claim 11 wherein the information specifying at least one additional component currently implemented in the electronic device includes identifiers of each of the components in a set of components currently implemented in the electronic device.

18. The apparatus of claim 17 wherein the identifiers of each of the components in the set of components are included in the reconfiguration request transmitted by the electronic device.

19. The apparatus of claim 11 wherein the reconfiguration request comprises a request for an upgrade of at least one of a software component and a hardware component of the electronic device.

20. The apparatus of claim 11 wherein the reconfiguration request is received from the electronic device over a network connection established, with a reconfiguration manager which includes the memory and processor.

21. An article of manufacture comprising a machine-readable medium containing one or more software programs which when executed implement the steps of:

receiving information representative of a reconfiguration request relating to an electronic device;

determining at least one device component required to implement the reconfiguration request;

comparing the determined component and information specifying at least one additional component currently implemented in the electronic device with at least one of a list of known acceptable configurations for the electronic device and a list of known unacceptable configurations for the electronic device; and generating information indicative of an approval or a denial of the reconfiguration request based at least in part on the result of the comparing step.

* * * * *